US 6,608,473 B2

(12) United States Patent
Beulich

(10) Patent No.: US 6,608,473 B2
(45) Date of Patent: Aug. 19, 2003

(54) ELECTRICAL MACHINE, ESPECIALLY A THREE-PHASE GENERATOR

(75) Inventor: Klaus Beulich, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 48 days.

(21) Appl. No.: 10/010,309

(22) Filed: Nov. 8, 2001

(65) Prior Publication Data

US 2002/0074978 A1 Jun. 20, 2002

(30) Foreign Application Priority Data

Nov. 9, 2000 (DE) .......................... 100 55 467

(51) Int. Cl.$^7$ .............................................. G05F 1/325
(52) U.S. Cl. .................... 323/348; 323/264; 323/908
(58) Field of Search ................................ 323/250, 252, 323/264, 331, 333, 338, 347, 348, 358, 362, 908; 336/155, 177, 178

(56) References Cited

U.S. PATENT DOCUMENTS 4,887,061 A * 12/1989 Matsumura ................. 336/178
5,432,439 A * 7/1995 Svoen .................... 323/357 X

FOREIGN PATENT DOCUMENTS

DE     199 35 074 A1     2/2000

* cited by examiner

Primary Examiner—Jessica Han
(74) Attorney, Agent, or Firm—Michael J. Striker

(57) ABSTRACT

The electrical machine, especially a three-phase generator, has a stationary stator (21); a rotatable rotor having an excitation coil (28), a rotary transformer (29) having a primary winding (30) and a secondary winding (31) on respective soft ferrite cores and magnetically coupled with each other via an air gap (38) and a control circuit (40) for loading the primary winding (30) of the rotary transformer (29) with an alternating current. The control circuit (40) includes an input-side current limiting circuit (46), whereby an integrated temperature control is obtained in cooperation with the soft ferrite cores of the primary and secondary windings according to the Curie effect.

6 Claims, 3 Drawing Sheets

ELECTRICAL MACHINE, ESPECIALLY A THREE-PHASE GENERATOR

BACKGROUND OF THE INVENTION

1. Field of the Invention

The present invention relates to an electrical machine, and, more particularly, to a three-phase generator including a stator, a rotor with an excitation coil, a rotary transformer with primary and secondary windings, which are arranged on respective cores of soft ferrite material and are magnetically coupled with each other by an air gap, and a control circuit for loading the primary winding of the rotary transformer with an alternating current.

2. Description of the Related Art

The basic structure of this type of electrical machine is known from a number of prior art references, for example from German Patent Application DE 199 35 074 A1. The three-phase generator described there has a stationary stator, a rotatable rotor with an excitation coil and a transformer with a primary and a secondary winding. The primary and secondary windings are each arranged on a soft ferrite core and are coupled with each other via an air gap. The rotary transformer delivers excitation power to the excitation coil. The primary winding of the rotary transformer is loaded with an alternating current with the help of a control circuit, which is converted and rectified on the secondary side of the rotary transformer with a rectifier circuit, for example a two way rectifier or a rectifier bridge circuit.

A common problem in the design and operation of this sort of rotary transformer is the adherence to a certain maximum temperature, in order to avoid overheating of the rotary transformer. A temperature sensor is built into the rotary transformer for this purpose in the state of the art. The temperature of the rotary transformer is detected with the help of the temperature sensor. When the temperature of the rotary transformer climbs to a prohibited value, the transformer power is reduced by a suitable control means.

This type of active control fulfills its purpose, however special components, such as the temperature sensor, suitable signal processing circuits and a controller for changing the transformer power, for example by an adjustment of an on/off ratio or key ratio, are necessary.

SUMMARY OF THE INVENTION

It is an object of the present invention to provide an electrical machine of the above-described type, especially a three-phase generator, which is improved so that the temperature is limited to avoid impermissibly high or excess temperatures without including a temperature sensor in the apparatus.

This object and others which will be made more apparent hereinafter are attained in an electrical machine, especially a three-phase generator, which comprises a stator, a rotor with an excitation coil, a rotary transformer with primary and secondary windings, which are arranged on respective cores of soft ferrite material and are magnetically coupled with each other via an air gap and a control circuit for loading the primary winding of the rotary transformer with an alternating current.

According to the invention the control circuit includes an input-side current limiting circuit, whereby an integrated temperature control is obtained in cooperation with the Curie effect occurring in the soft ferrite material of the respective cores of the primary and secondary windings.

The control circuit of the invention with the input-side current limiting circuit makes use of the fact that soft ferrite material in the vicinity of its Curie temperature looses its magnetic properties. Accordingly the magnetic permeability drops to a value equivalent to 1 at the Curie temperature. The ferrite material behaves like air and energy can no longer be transferred from the primary winding of the transformer to the secondary winding.

The principal advantages of the invention include a reliable control of excessive temperatures for the ferrite material and a reliable temperature regulation without the need of a temperature sensor.

BRIEF DESCRIPTION OF THE DRAWING

The objects, features and advantages of the invention will now be illustrated in more detail with the aid of the following description of the preferred embodiment, with reference to the accompanying figures in which.

DETAILED DESCRIPTION OF THE INVENTION

Figure 1:
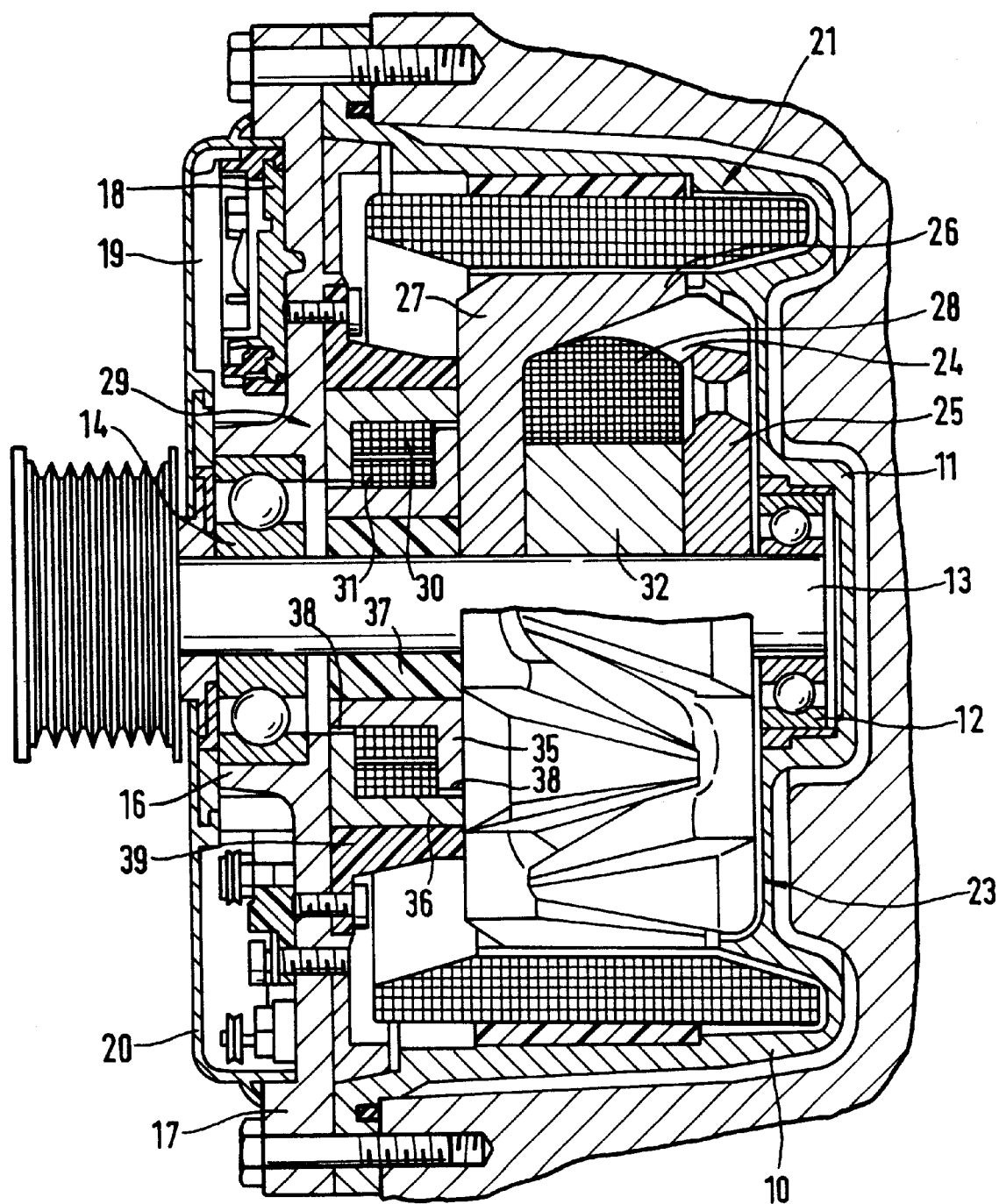
FIG. 1 is a cross-sectional view through a so-called claw pole generator.

The generator according to FIG. 1 has a somewhat pot-shaped housing 10. A hub 11 is formed on the bottom of the housing and holds a ball bearing 12, in which the inner end of a shaft 12 is arranged. The other end of the shaft 12 is arranged in another ball bearing 14, which is housed in another hub 16 formed in a bearing bracket 17 on the drive side of the housing. A cooling body 18 for a bridge rectifier and a controller 19 are mounted in a known manner on the bearing bracket 17. A bearing cover 20 closes the entire arrangement. A stator 21 with an alternating current coil is arranged in the housing 10.

A known so-called claw pole rotor system 23 is arranged approximately in the center of the housing 10 and its interior is mounted on the shaft 13. This system is provided with a first pole plate 25 attached to the shaft 13, running in the claw 24 and forming one pole rotor half and a second pole plate 27 running in the claw 26 and forming another pole rotor half. The tips of the claw 24 of the one pole plate extend between the claw 26 of the other pole plate. The claws 24 and 26 extend substantially parallel to the longitudinal axis of the shaft 13. An excitation coil 28 is mounted on one pole core 32, which is rigidly mounted on the shaft 13, between the claws of the claw pole rotator system 23. A transformer indicated with 29 is provided for supplying energy to the excitation coil system of the generator. The transformer 29 has an outer ring-shaped primary winding 30 on a soft ferrite core 36 and a concentric interior secondary winding 31 on a soft ferrite core 35. The secondary winding is arranged in the same plane as the primary winding, which extends perpendicular to the longitudinal axis of the shaft 13. The inner core 35 is attached to the shaft sleeve 37, which is magnetically inactive and fixed to the shaft 13. The outer core 36 and its primary coil 30 are screwed on a non-magnetic retaining ring 39 in the bearing bracket 17.

Figure 2:
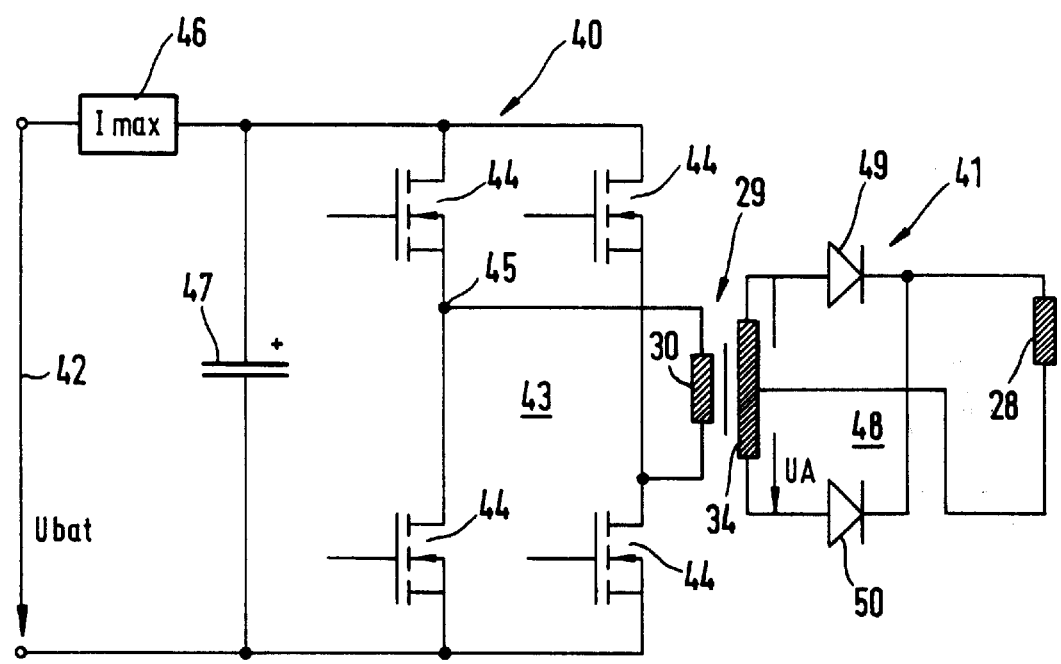
FIG. 2 is a circuit diagram of the transformer with a control circuit and excitation coil.

A circuit diagram of the rotary transformer 29 with its primary winding 30 and secondary winding 31 is seen in FIG. 2. The primary winding 30 is provided with a control circuit 40. The secondary winding 31 is provided with a rectifier circuit 41. The control circuit 40 has an input 42, to which an inverter 43 is connected.

This inverter comprises controllable semiconductor circuits 44, which are connected as an H bridge. The primary winding 30 of the transformer 29 is connected to a center tap 45 of the H bridge. A current limiting circuit 46 of a conventional type is connected between the input 42 and the inverter 43, whose operation is described in more detail in the following description. A filter condenser 47 is connected across the input 42.

A two-way rectifier circuit 48 is connected with the secondary winding 31. The two-way rectifier circuit 48 includes two rectifier diodes 49,50 and is connected with one terminal of the excitation coil 28. The other terminal of the excitation coil 28 is coupled with the center tap of the secondary winding 31.

When a direct current voltage Ubat is applied to the input 42, the primary winding 30 of the transformer is supplied with alternating current by means of the inverter, which induces an alternating current in the secondary winding 31. The two-way rectifier circuit 48 rectifies this alternating current in the secondary winding and the appropriate current is supplied to the excitation coil 28.

During the current conversion by means of the transformer 29 its soft ferrite cores 35,36 are heated. A suitable limit to the temperature must be provided for safety reasons in the primary circuit. The current limiting circuit 46 together with the temperature-dependent properties of the soft ferrite cores 35,36 provides this temperature limit.

Figure 3:
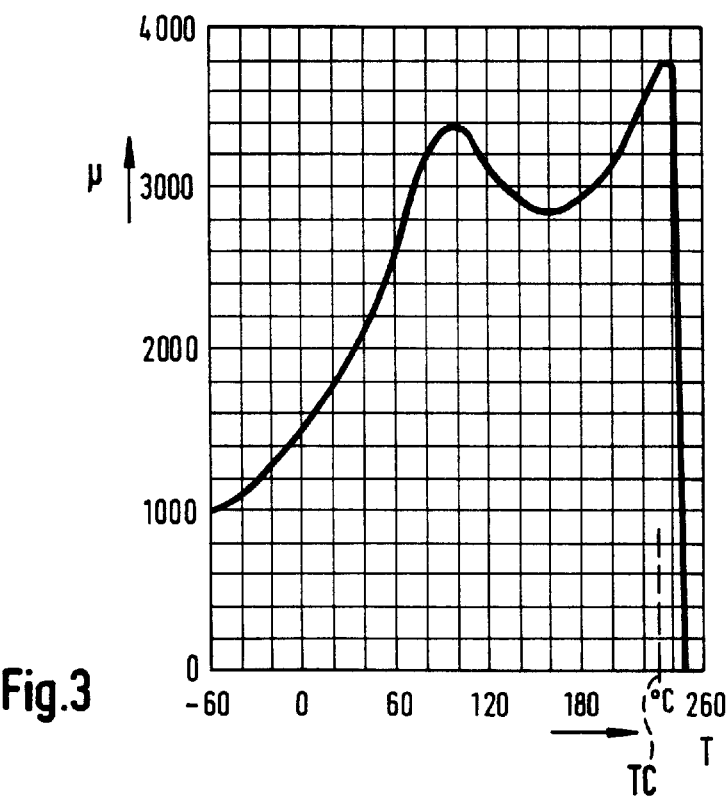
FIG. 3 is a graphical illustration of the dependence of magnetic permeability on temperature T.

For fundamental reasons—as shown in FIG. 3—the soft magnetic ferrite cores loose their magnetic properties in the vicinity of the Curie temperature TC.

If the initial permeability drops to a value of 1 at a temperature in the vicinity of, for example, 240° C., the ferrite material then behaves like air. No power is transferred then via the transformer 29.

Figure 4:
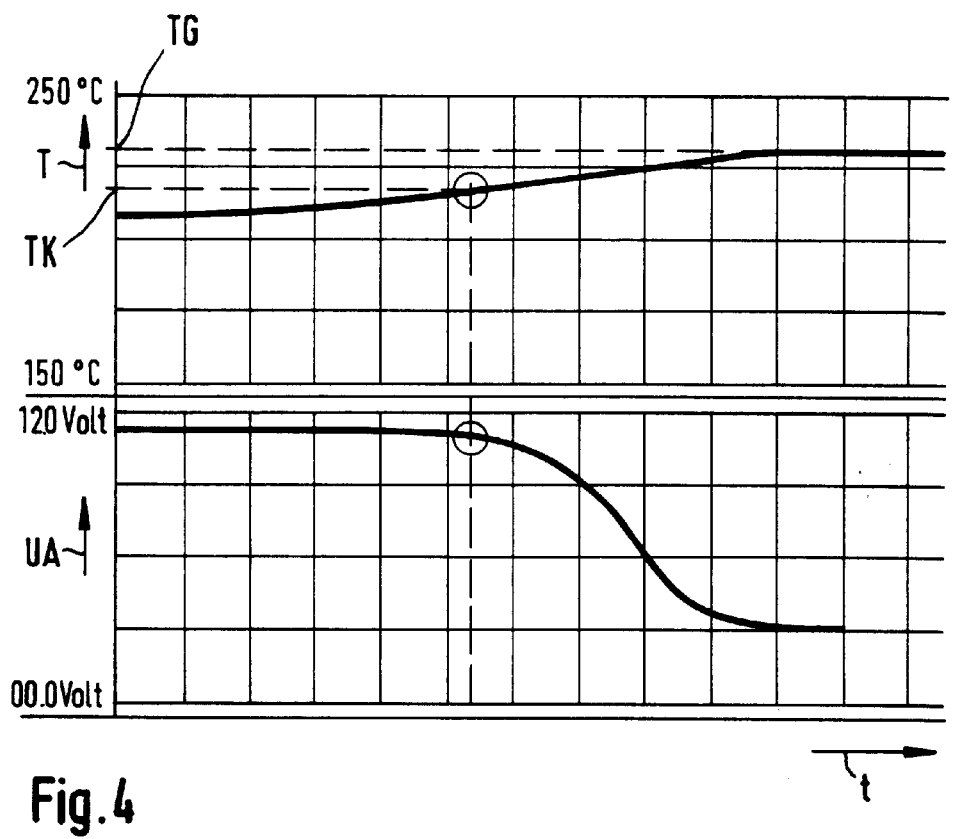
FIG. 4 is a graphical illustration of the dependence of temperature and output voltage of the transformer on time.

In operation the transformer is heated continuously, whereby the current in the primary side increases because of approach to the Curie temperature. When the current now reaches the limiting value for the current limiting circuit 46, it responds and the output voltage begins to fall. This is shown in the lower part of FIG. 4. A "bend or break temperature" TK of, for example, 215° C. is shown in the temperature curve in the upper part of FIG. 4. The temperature in the ferrite cores subsequently climbs further, whereby the output voltage and thus the excitation current fall due to the opposing effect of the current limiting device. The temperature then climbs until the built-up condition (right end of FIG. 4) is reached. The output voltage and the excitation current depend in their values on the current limiting device.

Figure 5:
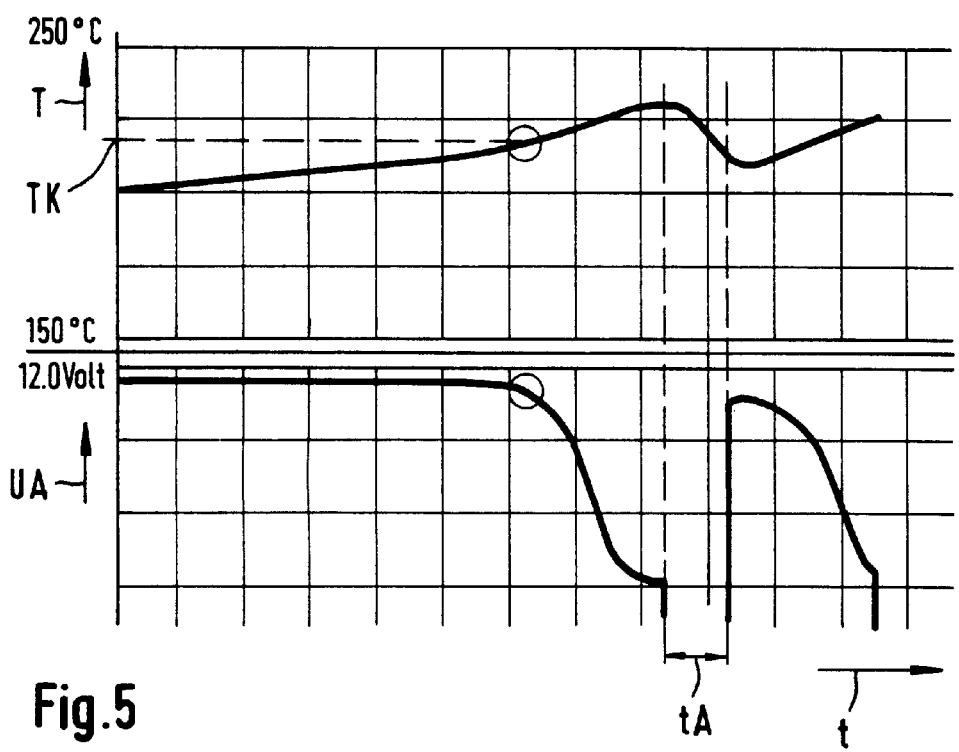
FIG. 5 is a graphical illustration analogous to FIG. 4 with two temperature-output voltage cycles.

When the input voltage Ubat is turned off long enough in this state, the system cools enough again so that it is under the "bend or break temperature" TK, so that subsequently again the complete transformer current can be converted. This process is often arbitrarily repeatable and completely reversible, as shown in FIG. 5. The turned off period is indicated with tA in FIG. 5. The temperature and output voltage behavior after the turned off period tA is shown in FIG. 5 for the building-up process (right end of FIG. 5).

In summary, from the foregoing it can be learned that an integrated temperature regulation is provided by the combination of the current limiting circuit 46 with the physical properties of the ferrite materials. This system is forced to behavior according to the limiting temperature TG without additional measures or features. In practice the "break or bend temperature" TK representing the responding temperature of the control circuit 40 is in practice the maximum operating temperature of the transformer, above which the transformable current and thus the efficiency decreases. The responding temperature depends on the Curie temperature TC of the soft magnetic material of the ferrite core 35, 36, on the performance losses in the ferrite cores 35, 36 in the vicinity of the Curie temperature TC and on the adjusted limiting current Imax.

The disclosure in German Patent Application 100 55 467.9 of Nov. 9, 2000 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in an electrical machine, especially a three-phase generator, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. An electrical machine comprising
    a stationary stator (21);
    a rotatable rotor having an excitation coil (28),
    a rotary transformer (29) having a primary winding (30) and a secondary winding (31), said primary winding and said secondary winding being arranged on respective cores (35, 36) consisting of soft ferrite material and magnetically coupled with each other via an air gap (38); and
    a control circuit (40) for loading the primary winding (30) of the rotary transformer (29) with an alternating current, said control circuit (40) including an input-side current limiting circuit (46);
    whereby an integrated temperature control is obtained in cooperation with the soft ferrite material of the respective cores according to the Curie effect.

2. The electrical machine as defined in claim 1, wherein said control circuit (40) includes means for providing a limiting current-dependent decrease of an output voltage (UA) of said rotary transformer (29) at a responding temperature (TK) of the current limiting circuit (46), whereby an excitation current supplied to the excitation coil (28) is decreased.

3. The electrical machine as defined in claim 2, wherein the means for providing the limiting current-dependent decrease of the output voltage forces a temperature of the transformer to reach a limiting temperature (TG).

4. The electrical machine as defined in claim 3, wherein the responding temperature (TK) represents a maximum operating temperature of the transformer (29).

5. The electrical machine as defined in claim 3, wherein the responding temperature (TK) depends on a Curie temperature (TC) of the soft ferrite material of the respective cores (35, 36), on performance losses in the respective cores (35, 36) in the vicinity of the Curie temperature (TC) and on an adjusted limiting current (Imax).

6. The electrical machine as defined in claim 1, consisting of a three-phase generator.

* * * * *